United States Patent Office 3,755,487
Patented Aug. 28, 1973

3,755,487
OLEFIN COMPLEXING PROCESS
Charles E. Jahnig, Rumson, David W. Savage, Summit, and Hugh H. Horowitz, Elizabeth, N.J., assignors to Esso Research and Engineering Company
Filed June 2, 1972, Ser. No. 259,078
Int. Cl. C07c 7/00
U.S. Cl. 260—677 A  10 Claims

ABSTRACT OF THE DISCLOSURE

A process is described for separating and recovering complexible ligands from feedstreams containing them, comprising the steps of complexing the ligands with a complexing solution, stripping impurities out of solution, decomplexing by flashing at pressures of from 1 atmosphere to about 40 atmospheres, recycling solvent to the complexer and thereafter recovering said ligands as a high purity product. The complexing solution comprises Group I-B metal salts dissolved in low volatility aromatic solvents. The ligands are decomplexed by either flashing off at high pressures or by multiple stage flashing.

FIELD OF THE INVENTION

Figure 1:
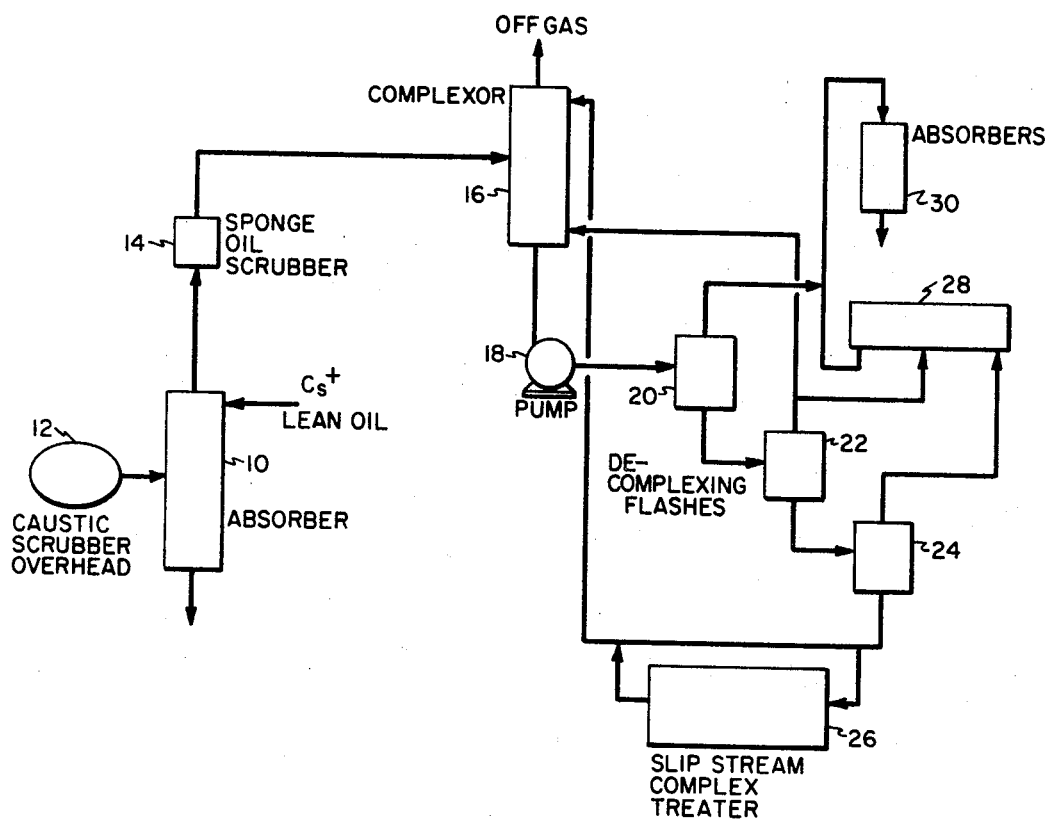

This invention relates to the separation and recovery of complexible ligands from a feedstream containing them. More particularly, the invention relates to an improved process or method of separating complexible ligands by contacting a feedstream containing said ligands with a complexing solution followed by impurity stripping from the solution, decomplexing by high pressure flashing or multiple stage flashing, recycling solvent to complexer and thereafter recovering high purity light olefin product. In one preferred embodiment the invention describes the step of decomplexing by high pressure flashing of the complexed ligands from the complexing solution. In another preferred embodiment the decomplexing of the complexed ligands is carried out by means of multiple stage flashing, wherein the pressure decreases in going from one flash to the next one downstream.

DESCRIPTION OF THE PRIOR ART

A number of processes for recovering complexible ligands from feedstreams have been described by the prior art workers. For example, in U.S. Pat. No. 3,410,924 a cuprous halide salt contained in an anhydrous slurry in the presence of a $C_5$ monoolefin sorbent activator is described as a means for recovering complexible ligands. A process for separating olefins from hydrocarbon mixtures by selective absorption with silver fluoroborates or silver fluorosilicate is described in U.S. Pat. No. 3,218,366. Another process taught in U.S. Pat. No. 3,401,112 is directed to the separation of nonaromatic unsaturated hydrocarbons from more saturated hydrocarbons by selective complex formation with cuprous trifluoroacetate dissolved in a solvent such as propionitrile and the like. Beckman et al. in U.S. 3,517,081 likewise discloses a process for the separation of unsaturated hydrocarbons from an admixture with saturated hydrocarbons by contacting with cuprous fluoroborate or cuprous fluorophosphate dissolved in aromatic hydrocarbon solvents such as toluene, ethylbenzene, ethyl toluene, xylenes and the like.

Finally, in Ser. No. 805,912 now U.S. Pat. No. 3,651,-159 and U.S. 3,592,865, the patentees describe the preparation and use of bimetallic salts such as $CuAlCl_4$ dissolved in aromatic hydrocarbons such as benzene for a process which permits the separation and recovery of complexible ligands by a ligand exchange operation. A major drawback of the processes described in these references is the high volatility of the benzene solvent together with the method of decomplexing. In these prior processes, the earlier designs used stripping or a one stage flash which had to operate at lower pressures of from 1 to 3 atmospheres to provide the lean solvent needed to give adequate ethylene recovery in the complexer. As a result of these drawbacks, the above teachings showed no economic advantage vs. conventional cryogenic techniques. Accordingly, an improvement in the operation of these prior art processes is thereby necessitated.

SUMMARY OF THE INVENTION

In accordance with the present invention, a process for separating and recovering complexible ligands from a feedstream containing said ligands is described. The process comprises the following steps; (1) complexing at least a major amount, i.e., >50% of the complexible ligands from the feedstream by contacting the feedstream in a complexer with a complexing solution; (2) stripping the impurities out of the complexing solution; (3) decomplexing by flashing at high pressures or decomplexing by multiple staged flashing; (4) recycling of complexing solution to the complexer; and (5) recovering said ligands as high purity products.

Preferably, the process is directed to the recovery of light olefins from feedstreams such as the light ends section of a conventional steam cracking unit. The improvement in the process is the overall economic savings which is realized as a result of lower equipment cost, lower solution inventory and shorter time at high temperature which minimizes solution decomposition.

The complexing solution comprises a substantially nonvolatile or low volatility aromatic solvent and dissolved in said solvent is a Group I-B metal salt. The use of nonvolatile solvents, it has been found, avoids previous heat requirements associated with vaporizing benzene during the flashing-off technique. A further advantage for the use of the nonvolatile or low volatility aromatics is that their use improves the decomplexer operation by mass action solvent losses being minimal, whereas in the case of benzene, the ethylene is more difficult to decomplex in the resulting benzene deficient liquid. Finally the low volatility system also eliminates the need for solvent recovery from the tail gas leaving the complexer and from the product ethylene.

The novelty of the present process resides in the embodiment whereby decomplexation is carried out by simple heating under the vapor pressure of the olefin, wherein the thermal equilibrium of the system is utilized. This embodiment is an advantage over prior methods of decomplexing such as displacement with other olefins, stripping with inert gases, or stripping with volatile solvents which all suffer from economic drawbacks. The thermal equilibrium of the system is useful for decomplexing purposes because the solvent is nonvolatile and the absorbent is invarient with temperature and pressure.

Figure 2:
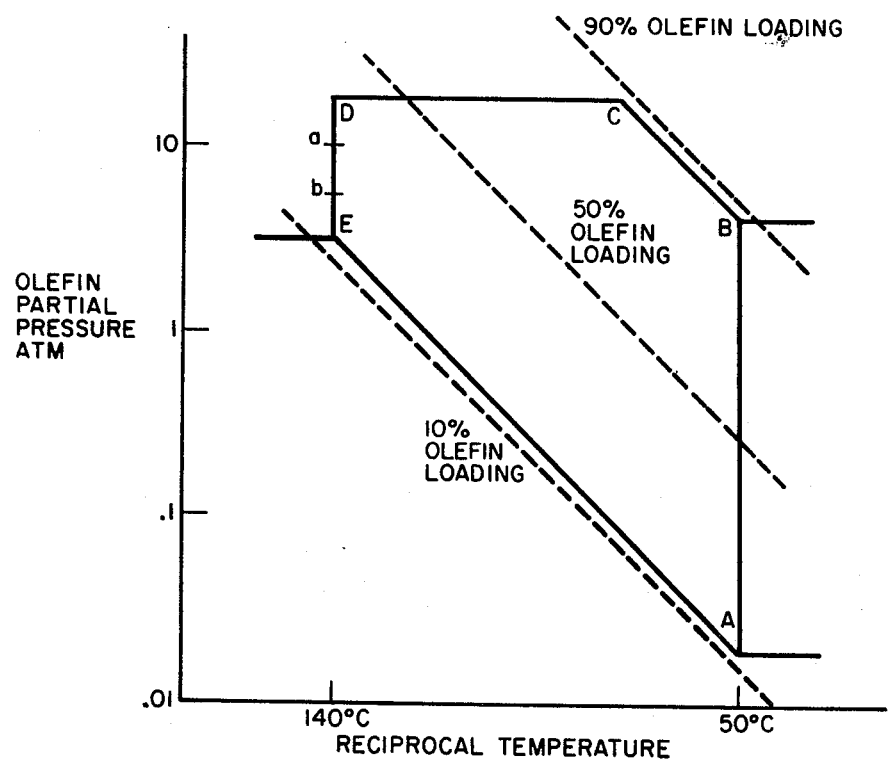

The operation of this embodiment is depicted in the pressure-temperature diagram, FIG. 2. FIG. 2 depicts lines of constant olefin loading (expressed as mols olefin per 2 mols of copper × 100%) on a graph of olefin partial pressure against reciprocal temperature. The olefin separation cycle is represented by moving counter-clockwise around ABCDE of the drawing, Point A represents typical conditions at the top of the complexer where lean complex (typically 10% loaded with $C_2^=$) is recycled to complexer. Temperature in the order of 50° C. is fixed by available cooling water and heat exchange-temperature gradient. Olefin pressure is fixed by the desired olefin recovery from the feed gas. Movement along the vertical line from A to B represents passage of complexing solution down the complexer; temperature is approximately constant as heat of complexation is recovered. At point B, which represents conditions at the olefin-gas mixture feed point in the complexer, the complexing solution may be about 90% loaded with olefin.

The next step of the cycle is represented by the constnt olefin loading line BC. At C, the complex has been pumped up to the desired olefin product pressure, which may typically be 15–25 atmospheres. Decomplexing represented by the segment CDE is carried out by heating to about 140° C., the exact temperature being limited by stability of the complex. In the first stage, while heating up to about 140° C., olefin product is taken off, typically at a pressure of 15–25 atmospheres. It will be appreciated that initial increments of product could be taken off at higher pressures, if this proves desirable. Subsequent decomplexing stages, represented by points (a) and (b) along the constant temperature line DE, serve to release olefin at intermediate pressures, while maintaining the complexing solution at about 140° C. By E, representing the end of the third stage, olefin in the complexing solution has been reduced to about 10 percent. This complex is now recycled to the complexer with cooling (line EA) and the cycle is repeated. In the cycle described in this paragraph, product olefin gas from the second and subsequent stages will generally be compressed to the desired product pressure.

Additionally, it has been discovered possible to avoid recoverey of product gas at low pressures by using the following embodiment. In this embodiment, the low pressure gas, for example at 3 atmospheres is reabsorbed by a fraction of the olefin-lean complex at the low complexing temperature of 120–200° F. The resaturated complex is sent back to the first decomplexing stage where olefin is released by flashing at the desired high product pressure. This embodiment is identical to that described previously in the complexing impurity stripping and high-pressure flash decomplexing sections. The differences include elimination of compression and changes in the intermediate and low-pressure flashes. The intermediate pressure flash for example at 10 atmospheres is designed to provide just sufficient olefin product at 10 atmospheres to satisfy the complexer impurity stripping section requirement. The remaining olefin is flashed at low pressure, for example 3 atmospheres, and instead of compression to product line pressure, it is reabsorbed in a fraction of the olefin-lean complex solution and returned to the high-pressure flash stage. The ratio of lean complex flow to the reabsorber to lean complex flow to the complexer is in the order of about 0.45.

The invention, as described in the preceding paragraphs, pertains to the recovery of olefins in very high purity, e.g., 99.9 mole percent, as generally needed for chemicals operation such as polyethylene manufacture. In other areas, for example, fuels processes such as the alkylation with ethylene and propylene of $C_4$ hydrocarbons, the desired purity of the olefin product may be relaxed somewhat to the 95–98% level. When this is the case, the preferred embodiment may differ slightly from that described above for very high purity olefin recovery. For instance, the process may be operated to complex a major amount, i.e., >50% of the feedstream olefins. Additionally it may be desirable to omit or limit the impurity section at the bottom of the complexer. It also may be desirable to combine the preferred method of decomplexing, i.e., flashing by heating, with stripping employing a stripping gas such as $C_4$ hydrocarbons. This is a particularly advantageous process in which recovered olefin and $C_4$ hydrocarbon go subsequently together to an alkylation reactor, for example.

It has been surprisingly discovered that when a light olefin recovery process is operated, using low volatility or nonvolatile complexing solvents containing dissolved Group I-B metal salts, to complex the olefins, followed by a decomplexing step which utilizes either high pressure flashing or multiple stage flashing, that the process leads to an efficient and economically attractive method for the separation and recovery of light olefins such as ethylene and propylene.

With low volatility aromatic solvents, decomplexing is effected by flashing at temperatures in the range of from about 50° F. to about 500° F., preferably from about 200° F. to about 400° F., in order to avoid product compression. Earlier processes used inert gas stripping, ligand exchange, or a one stage flash which then had to be operated at low pressures of from 1 to 3 atmospheres to provide the lean solvent needed to produce adequate ethylene recovery in the complexer. As has been discussed above multiple stage flashing is considerably better. Half of the ethylene product, for example, can be taken off at over 200 p.s.i.g. and may require no further compression depending on commercial requirements. The second stage flash recovers more ethylene, part of which can be used as a stripping gas to remove ethane and other impurities from the olefin-rich solvent. The third flash at a somewhat lower pressure, cleans up the ciriculating complex sufficiently so that high ethylene recovery can be achieved in a complexer.

The process is suitable for the separation and recovery of a wide variety of complexible ligands such as olefins, acetylenes, aromatics, carbon monoxide and the like, and more specifically the unsaturated hydrocarbons can be acetylenes such as $C_2$–$C_6$ acetylenes, preferably $C_2$–$C_4$ acetylenes, for example, acetylene, methyl acetylene, ethyl olefins such as $C_2$–$C_{20}$ monoolefins, preferably $C_2$–$C_{10}$, more preferably $C_2$–$C_5$ monoolefins, most particularly ethylene and propylene; conjugated diolefins such as $C_4$–$C_{10}$ conjugated diolefins, preferably $C_3$–$C_6$ for example, butadiene, isoprene, and the like, polyolefins such as $C_6$–$C_{16}$, preferably $C_6$–$C_{12}$ polyolefins, for example, cyclododecatriene, cyclooctadiene; cyclic olefins and alicyclic olefins such as $C_5$–$C_{10}$, preferably $C_6$–$C_8$, for example, cyclopentene, cyclohexene, cyclooctene, etc.; aromatics such as $C_6$–$C_{12}$ aromatics, preferably $C_6$–$C_8$ aromatics, for example benzenes, toluenes and xylenes; in cumulative diolefins such as $C_3$–$C_6$ cumulative diolefins, for example allene, preferably the process is applicable to the separation of light monoolefins such $C_2$–$C_4$ monoolefins and other complexible ligands such as $C_2$–$C_4$ acetylenes, carbon monoxide and $C_6$–$C_9$ aromatics.

Generally the complexible ligands to be separated and recovered by the process are contained in a feedstream in admixture with other components which are not as preferentially complexed. For example such feedstreams as ethane-ethylene or propane-propylene and their mixtures can be treated to concentrate the olefin; said feedstreams may also be dilute in ligand concentration.

The complexing solution employed in the operation of the present invention is generally described as a low volatility solvent solution of a Group I–B metal salt. The solvent is essentially aromatic and the metal is copper or silver. Representative examples of useful metal salts include $CuAlCl_4$, $CuBF_4$, $CuPF_6$, $CuCOOCF_3$, $CuBCl_4$, $CuAlBr_4$, $CuAlCl_xBr_y$ and $Cu\phi_xAlCl_y$ wherein $\phi$ is phenyl, $x$ and $y$ are integers whose sum $(x+y)$ is 4. Suitable low volatility solvents are disclosed in copending application Ser. No. 259,077. These solvents are essentially aromatic compositions boiling in the range of about 500° F., and melting no higher than 60 to 100° F., and having multiple aromatic rings with minimum substituents. The complexing solution may contain additives to minimize chemical reactions and corrosion inhibitors such as antimony or bismuth compounds, phosphines, amines, cuprous chloride and the like. The ratio of solvent to copper is from 0.1 to 5.0 aromatic rings per copper, preferably 0.1 to 4.0, most preferably from 0.5 to 3.0 aromatic rings per copper.

After complexing of the light olefins contained in the feedstream, impurities are stripped out of solution. This step of the process may be carried out by recycling to the complexer a portion of the light olefins recovered downstream to thereby strip out of solution, impurities, such as ethane and the like; omitting or limitting impurity stripping is possible when ligand purity is not critical.

The decomplexing step of the process is effected in one of two ways. One way is by flashing i.e., heating, at high pressures; by high pressure is meant pressures of from 1 to 40 atmospheres, preferably from 20 to 40 atmospheres, and the heating is conducted at temperatures of from 150 to 500° F., preferably from 200 to 300° F., and more preferably from 225 to 280° F. In another preferred embodiment decomplexing may be carried out by multiple staged flashing. Staged flashing is described as flashing-off by heating in multiple stages in which the pressure decreases in going from one flash to the next one downstream. The initial flash may be at a pressure that is equal to or greater than the product ethylene line pressure. A subsequent flash stage may be at or greater than the pressure of the impurity stripping section of the complexer and the final flashes may be conducted at lower pressures, for example, 1 to 5 atmospheres, commensurate with obtaining satisfactory ethylene recovery in the complexer.

Solvent recovery as a step in the process includes recycling of the complexing solution back to the complexer. It may additionally include slip stream treating of the complex to maintain at low levels any species that might catalyze chemical reaction or promote corrosion. This slipstream treating may involve stripping, settling and contact with solid cuprous chloride to eliminate any free $AlCl_3$, etc.

Finally, the high purity light olefin product such as ethylene is recovered and final purification includes the elimination of any trace solvents and any light side reaction products. The invention may be more clearly understood by reference to FIG. 1.

The process may be operated at a wide variety of temperature and pressure conditions. For any given complexing reaction, temperatures may range from about $-40°$ F. to about 300° F., preferably from $-40°$ F. to about 200° F., and more preferably from about 50° F. to 150° F. Pressure similarly may vary widely and can range from about 0.5 atmosphere to about 100 atmospheres. When decomplexing is carried out by fashing-off at high pressures, these pressures may range from 1 to 50 atmospheres, preferably from 20 to 40 atmospheres, and most preferably from 25 to 35 atmospheres.

A process flow diagram is shown in FIG. 1. The apparatus comprises a de-ethanizer section 10 followed by the olefin complexing/decomplexing section. The purpose of the de-ethanizer is to provide a $C_2$- feedstream which is sent to the complexer. In the complexer 16 ethylene is selectively removed from the $C_2$-gases and subsequently recovered in high purity from the decomplexer.

De-ethanization may be carried out by absorption, typically at 60–150° F. and 150–250 p.s.i.g., of $C_3$ and heavier material from a $C_5$- cut from steam cracking or other operations. Alternatively, low-temperature distillation may be used. The feed to the de-ethanizer is usually scrubbed in the caustic scrubber overhead 12 with caustic or amine to remove acid gas impurities, such as carbon dioxide and sulfur compounds. The de-ethanizer generally makes a clean enough separation between $C_2$ and $C_3$ components to meet a less than 50 p.p.m. specification on $C_3^+$ in the ethylene product. In the absorber de-ethanizer the absorbing solution may be a $C_5$–$C_6$ oil cut comprising mainly aromatics and diolefins. The de-ethanizer is followed by a heavy sponge oil scrubber 14 to recover any $C_5^+$ oil carried over in the $C_2$-stream. $C_2$-from the sponge tower overhead passes through acetylene conversion facilities and driers into the ethylene complexer 16 at 50–150° F. and 100–250 p.s.i.g.

The ethylene complexer may be a conventional plate column in which a complex comprising an aromatic solution of cuprous salt sorbent material, lean in ethylene (having typically about 0.1 to 0.5 mols of ethylene per mol of copper) is fed to the top tray and flows downward countercurrently to the feed gas stream which is introduced at the bottom. Ethylene is complexed into the liquid phase, while the other gases go overhead. Intercoolers are provided along the column to remove from the complexing solution the heat of complexation of ethylene. Typically, up to three total-drawoff pump-arounds are used for heat removal. The temperature profile in the complexer would be about 120° F. at the top, 120°–150° F. at the feed plate, with a maximum intermediate temperature of 170° to 190° F. Total pressure in the complexer is typically 5–20 atmospheres. The noncomplexed gases, e.g., hydrogen, methane, ethane, pass overhead usually into a fuel system. A section of tower below the feed plate is provided to strip out dissolved saturated hydrocarbons, such as ethane and undesirable complexed species, such as carbon monoxide and acetylenes. The stripping gas for this section is provided by recycling high purity olefin gas from the intermediate decomplexer flash to the base of the complexer-stripper tower. Temperature in the stripping section may run 120° to 160° F.

The bottoms from the complexer-stripper tower which is highly loaded in ethylene (typically 1.5–1.9 mols of ethylene/mol of copper) is pumped up in pressure to 15–40 atmospheres by pump 18 and sent through a heat exchanger into the first of a series of decomplexing flashes. In the first flash 20, typically at 250–300° F., and 250–350 p.s.i.g., a large fraction of the ethylene is flashed off into the product line. The complex then flows to a second flash 22 at the same temperature and pressure lower than in the first flash but higher than in the complexer stripper tower to provide product and some stripping gas for recycle to the complexer stripper. Finally, lower pressure flashes 24 liberate additional ethylene which must be compressed to product pressure. A typical pressure sequence for the decomplexing flashes would be: first flash 250–350 p.s.i.g.; second flash 100–200 p.s.i.g.; third flash $-0$ to 50 p.s.i.g.; fourth atmospheric pressure flash (not shown) may also be included The lean complex from the final flash is recycled back to the top of the complexing tower after being cooled in heat exchanger with the ethylene-rich complex. Complex treatment facilities to remove any undesirable side reaction products or impurities may be provided in a slipstream complex treater 26 from the order of 1–10% of the complex stream.

A staged product compressor 28 is provided for the ethylene from the intermediate and low pressure decomplexing flashes. A small amount of aromatic solvent carried over from the decomplexing flashes is condensed in compressor knock-out drums, and remaining traces are removed from the product stream by adsorbers 30 on final fractionation. A fraction of the product may be liquefied with low-level refrigeration for storage.

The present invention may be illustrated but is not necessarily limited to the following examples:

EXAMPLE 1

In this example, ethylene was recovered at 270 p.s.i.g. in 99.9 mol percent purity from a steam cracker off-gas out of a $C_2$ and lighter materials fraction containing hydrogen, methane, ethane, ethylene as major constituents and also traces of carbon monoxide, propane, propylene, methyl acetylene and propadiene.

The aromatic complex solution was the cuprous salt sorbent $CuAlCl_4$ dissolved in a mixed, low solubility solvent comprising 0.9 mol i-propyl biphenyl per mol Cu and 0.7 mol tri-isopropyl benzene per mol Cu. This was prepared by blending the mixed solvent with CuCl and $AlCl_3$, as described in application Ser. No. 805,912, now U.S. Pat. No. 3,651,159, herein incorporated by reference.

Complexing was carried out by contacting the complex solution and ethylene-containing feed gas in a water-cooled complexer tower having 12 perforated trays. Temperature was 130–150° F., total pressure 10 atmospheres. The feed gas contained 40 mol percent ethylene. 99.5% of the ethylene was recovered from the feed gas as determined by gas chromatographic analysis. The ethylene-loaded complex containing 1.75 mol percent $C_2^=$/mol Cu then passed to an impurity stripper, a perforated plate column with 24 trays. The ethylene stripping gas rate was 0.1 mol per mol Cu; temperature was 130–160° F., pressure 10 atmospheres. High-purity ethylene was fed to the base of the stripper as stripping gas. Non-ethylene components were stripped from the solution to the point at which the recovered ethylene contained <10 p.p.m. carbon monoxide, <700 p.p.m. methane and ethane, and <50 p.p.m. of $C_3$ materials.

For decomplexing, the ethylene-loaded complex solution was pumped to 294 p.s.i.g. pressure, and heated to 280° F. in a heat exchanger tube with heat supplied by insulating hot oil. Ethylene which flashed off under these conditions separated from the complex solution in a flash drum of 130 cc. volume. The complex from the first flash, containing 1.15 mols ethylene per mol Cu, passed to a second flash at 140 p.s.i.g., which reduced the ethylene loading to 0.85 mol ethylene per mol Cu. In a third flash at 39 p.s.i.g. the ethylene was reduced to 0.5 mol ethylene per mol Cu. Recovered ethylene was analyzed for impurities with a gas chromatograph.

EXAMPLE 2

In this example, mixed ethylene and propylene were recovered at 270 p.s.i.g. and 98.5 mol percent olefin purity from a catalytic cracker off-gas containing $C_3$ and lighter materials stream such as propane, propylene, methane, ethylene, ethane, hydrogen, carbon dioxide and nitrogen.

The cuprous salt solvent was $CuAlCl_4$ dissolved in a mixed, low volatility, aromatic solvent comprising 1.1 mols diphenyl methane per mol of Cu; the complex preparation, as well as the equipment employed, was as described in Example 1.

The feed gas contained 8 mol percent ethylene and 30 mol percent propylene. Complexing was carried out at 125–150° F., and impurity stripping at 140–160° F. The amount of high purity ethylene plus propylene stripping gas was adjusted to achieve 98 mol percent olefin purity in the flashed mixed olefin. The amount of stripping gas needed was 0.075 mol ethylene plus propylene per mol Cu. Staged, flash decomplexing at 260° F. and 292 p.s.i.g., 150 p.s.i.g. and 35 p.s.i.g. reduced the olefin loading in the complex from 1.85 mols per mol of Cu to 0.6 mol per mol Cu leaving the low-pressure flash stage. Gas chromatographic analysis of product gas showed that 20.6 mole percent ethylene and 77.4 mole percent propylene was present.

What is claimed is:

1. A process for separating and recovering complexible ligands selected from the group consisting of $C_2$–$C_6$ acetylenes, $C_2$–$C_{20}$ monoolefins, $C_4$–$C_{10}$ conjugated diolefins, $C_6$–$C_9$ aromatics and carbon monoxide from a feedstream containing same which comprises:
    (a) complexing at least a major amount of the ligands contained in the feedstream by contacting said feedstream in a complexer with a complexing solution comprising a low volatility aromatic solvent and a Group I–B metal salt;
    (b) stripping impurities out of the complexing solution;
    (c) decomplexing by flashing at pressures of from about 1 atmosphere to about 40 atmospheres and at temperatures of from 200° F. to about 400° F.;
    (d) recycling complexing solution to the complexer, and
    (e) recovering said ligands as high purity products.

2. The process of claim 1 wherein said ligands are $C_2$–$C_4$ monoolefins.

3. The process of claim 1 wherein the impurities are stripped-out of solution by recycling to the complexer a portion of the $C_2$–$C_4$ monoolefin which is recovered.

4. The process of claim 1 wherein the Group I–B metal salt is selected from the group consisting of $CuAlCl_4$, $CuBF_4$, $CuPF_6$, $CuCOOCF_3$, $CuBCl_4$, $CuAlBr_4$, $CuAlCl_xBr_y$ and $Cu\phi_xAlCl_y$ wherein $\phi$ is phenyl and $x+y$ is 4.

5. The process of claim 1 wherein the Group I–B metal salt is $CuAlCl_4$.

6. A process for separating and recovering light olefins comprising $C_2$–$C_4$ monoolefins from a feedstream containing the same which comprises the steps of
    (a) contacting said feedstream in a complexer with a complexing solution comprising low volatility aromatic solvents and a cuprous (I) salt selected from the group consisting of $CuAlCl_4$, $CuBF$, $CuPF_6$, $CuCOOCF_3$, $CuBCl_4$, $CuAlBr_4$, $CuAlCl_xBr_y$ and $Cu\phi_xAlCl_y$ wherein $\phi$ is phenyl and $x+y$ is 4, to complex at least a major amount of the light olefins contained in said feedstream;
    (b) stripping impurities from the complexing solution;
    (c) decomplexing by flashing-off in multiple stages wherein pressure is decreased in each successive stage;
    (d) recycling complexing solution to the complexer; and
    (e) recovering high purity light olefin product.

7. The process of claim 6 wherein the impurities are stripped-out of solution by recycling to the complexer a portion of the light olefin recovered.

8. The process of claim 6 wherein the cuprous (I) salt employed is $CuAlCl_4$.

9. The process of claim 6 wherein the pressures employed in Step (c) range from about 250–350 p.s.i.g. for a first flash down to about 0–50 p.s.i.g. for a final flash.

10. A process for separating and recovering ligands contained in a feedstream, said ligands selected from the group consisting of $C_2$–$C_4$ olefins, $C_2$–$C_4$ acetylenes, $C_6$–$C_9$ aromatics and carbon monoxide which comprises the steps of:
    (a) contacting said feedstream in a complexer with a complexing solution comprising low volatility aromatic solvents and a cuprous (I) salt selected from the group consisting of $CuAlCl_4$, $CuBF_4$, $CuPF_6$, $CuCOOCF_3$, $CuBCl_4$, $CuAlBr_4$, $CuAlCl_xBr_y$ and $Cu\phi_xAlCl_y$ wherein $\phi$ is phenyl and $x+y$ is 4, complexing at least amajor amount of said ligands contained in the feedstream;
    (b) stripping impurities from the complexing solution;
    (c) decomplexing by flashing off in multiple stages wherein pressure is decreased in each successive stage;
    (d) recycling complexing solution to the complexer; and
    (e) recovering high purity ligands as products.

References Cited
UNITED STATES PATENTS

| | | | |
|---|---|---|---|
| 3,592,865 | 7/1971 | Long et al. | 260—677 A |
| 3,651,159 | 3/1972 | Long et al. | 260—681.5 C |
| 3,410,924 | 11/1968 | Fasce | 260—677 |
| 3,218,366 | 11/1965 | Baxter | 260—677 |
| 3,517,081 | 6/1970 | Beckham et al. | 260—677 |

DELBERT E. GANTZ, Primary Examiner

J. M. NELSON, Assistant Examiner

U.S. Cl. X.R.

260—681.5 C